United States Patent
Langlois

(10) Patent No.: US 8,292,612 B2
(45) Date of Patent: Oct. 23, 2012

(54) MOULD SUPPORT FOR OVERSTROKE BASE

(75) Inventor: Jean-Christophe Langlois, Octeville-sur-Mer (FR)

(73) Assignee: Sidel Participations, Octeville sur Mer (FR)

(*) Notice: Subject to any disclaimer, the term of this patent is extended or adjusted under 35 U.S.C. 154(b) by 0 days.

(21) Appl. No.: 13/319,489

(22) PCT Filed: May 11, 2010

(86) PCT No.: PCT/FR2010/050909
§ 371 (c)(1),
(2), (4) Date: Nov. 8, 2011

(87) PCT Pub. No.: WO2010/130940
PCT Pub. Date: Nov. 18, 2010

(65) Prior Publication Data
US 2012/0052148 A1   Mar. 1, 2012

(30) Foreign Application Priority Data
May 14, 2009   (FR) ...................................... 09 53203

(51) Int. Cl.
*B29C 49/00* (2006.01)

(52) U.S. Cl. ........ 425/525; 264/531; 264/534; 425/522; 425/528; 425/529

(58) Field of Classification Search .................. 264/531, 264/534; 425/522, 525
See application file for complete search history.

(56) References Cited

U.S. PATENT DOCUMENTS

| | | | |
|---|---|---|---|
| 3,819,789 A * | 6/1974 | Parker | 264/534 |
| 4,465,199 A | 8/1984 | Aoki | |
| 5,785,921 A | 7/1998 | Outreman et al. | |
| 6,089,854 A * | 7/2000 | Outreman et al. | 425/526 |
| 7,037,099 B2 * | 5/2006 | Linke et al. | 425/182 |
| 7,563,090 B2 | 7/2009 | Dannebey et al. | |
| 2008/0260884 A1 | 10/2008 | Dannebey et al. | |
| 2008/0283533 A1 | 11/2008 | Tilton et al. | |
| 2009/0130246 A1 * | 5/2009 | Tonga et al. | 425/535 |

FOREIGN PATENT DOCUMENTS

| | | | |
|---|---|---|---|
| FR | 2 508 004 A1 | 12/1982 | |
| FR | 2 714 631 A1 | 7/1995 | |
| WO | WO 2006/103344 A1 | 10/2006 | |
| WO | WO 2007016959 A1 * | 2/2007 | |

* cited by examiner

*Primary Examiner* — Yogendra Gupta
*Assistant Examiner* — Amjad Abraham
(74) *Attorney, Agent, or Firm* — Sughrue Mion, PLLC

(57) ABSTRACT

The mould top support (3) for shaping the bottom of a thermoplastic bottle by what is called the "boxed top" process comprises: a base (10) interposed between the said mould top (3) and a sliding bolster (11) which is guided on the frame (6) of the mould carrier unit, which base (10) is made in the form of a dual-acting cylinder actuator, the rod (14) of which supports said mould top (3). The base plate (17), which closes off the cylinder of the actuator is provided with a rapid assembly finger (18) on the bolster (11). This base plate (17) includes, around the finger (18), on the one hand, holes designed to allow the sealed passage of nozzles that deliver a heat-transfer fluid and demoulding air into the mould top (3) and, on the other hand, zones for the attachment of the feed nozzles for the chambers (21 and 22) of the cylinder actuator, which nozzles are all placed parallel to the axis x-x' of displacement of said mould top (3).

10 Claims, 1 Drawing Sheet

MOULD SUPPORT FOR OVERSTROKE BASE

CROSS REFERENCE TO RELATED APPLICATIONS

This application is a National Stage of International Application No. PCT/FR2010/050909 filed May 11, 2010, claiming priority based on French Patent Application No. 09 53203 filed May 14, 2009, the contents of all of which are incorporated herein by reference in their entirety.

The present invention relates to an improvement to the equipment used for moulding containers such as bottles, by an operation of stretch-blow moulding of preforms made of thermoplastic material, said operation implementing a moulding process of the type known as "overstroking".

The invention relates more particularly to the support of the part of the mould which contains the cavity of the base of the container, or of the bottle, i.e. the mould of the base, commonly called the mould base.

This "overstroke base" shaping technique, which is in particular described in the document FR 2 508 004, is used for moulding containers, and in particular bottles, which must have particular characteristics as regards stiffness; it makes it possible above all to improve the structural stiffness of the base of the bottle.

This technique consists, as described in the abovementioned document, of moving the part of the mould which serves for shaping the base of the bottle in order to push this base back from a position that it occupies at the end of the initial blow-moulding operation to a position which corresponds to that of the final bottle shaping operation.

This operation of moulding with overstroking is carried out while keeping the walls of the mould at a certain temperature, of the order of 140° C., in order to promote the deformation of the thermoplastic material constituting the bottle. This temperature is reached by means of controlled circulation of a heat-transfer fluid.

After this shaping of the base of the bottle by the mould of the base (or mould base), said base is cooled down by a stream of air which, at the same time, makes it possible to detach it from the cavity of said mould of the base, before the final demoulding operation.

This part of the mould which makes it possible to shape the base of the container, is called the mould base in the remainder of the text.

This mould base is arranged on a support, which support is itself designed to cooperate with the rest of the mould, i.e. with the two die halves which contain the cavity of the body of the bottle. The assembly comprising the die halves and the mould base constitutes the actual mould, which mould forms part of what is called the moulding unit, knowing that a blow-moulding machine generally comprises several moulding units, distributed on a carousel.

The mould base support in fact comprises two parts which are joined by appropriate means: —a base on which said mould base is fixed and—a bolster on which said base is detachably fixed.

The bolster is connected to the frame of the moulding unit using guidance means; this bolster does in fact slide with respect to the two die halves of the mould, between an active position which allows the bottle moulding operation and an inactive position where it is situated set back from said die halves, in order to allow the removal of the moulded bottle from the moulding unit.

The feeding of the mould base with heat-transfer fluid and, as indicated previously, with demoulding and cooling air, is carried out by means of pipes which are attached to the base of the support, which pipes are then extended into said base, in the form of channels, in order to reach the mould base which is fixed on said base.

The base of the mould base is in fact presented in the form of a cylinder actuator, as described in particular in the document FR 2 714 631. This cylinder actuator makes it possible to move the mould base during the different stages of the bottle shaping operation.

This cylinder actuator, which operates by means of compressed air, itself requires an appropriate feed, by means of pipes which are attached to the body of said cylinder actuator, i.e. to its fixed part.

The pipes which feed the mould base pass through the sliding part of the cylinder actuator, i.e. through the piston, in order to reach said mould base which is firmly fixed to said piston.

Given the production rates of current machinery, the same machine must have a certain versatility, i.e. it must be capable of producing different types of bottles the volumes and formats of which may vary.

This versatility involves the mounting and the removal of the parts of the mould which serve to shape the bottles, i.e. the mould base and the die halves which contain the cavity of the external contour of the bottle, which die halves are themselves also generally mounted on supports.

The supports of these die halves are themselves borne by a structure constituted by shells, or angle brackets, which shells are hinged on the frame, or console, of the mould carrier unit.

Due to the presence of the different cylinder actuator and mould base feeds, the support of this mould base occupies a relatively large amount of space in all directions and, during a change of format, changes of parts are consequently required, such as a change of the supports of the die halves in order to adapt them to the space requirement of said mould base supports.

In the case of completely versatile machinery, it is also necessary to provide for a change of the bolster, i.e. the part bearing the base to which the mould base is fixed.

These constraints of changing parts give rise to significant tooling costs.

The present invention proposes an arrangement of this mould base support which makes it possible to remedy the drawbacks of current equipment and to make the current machinery more versatile, at the very least to make the operations which are linked to the bottle format changes simpler and more practical.

The present invention proposes an arrangement of the mould base support which makes it possible to limit interventions during bottle format changes and, above all, to limit the number of parts to be used in order to cope with a wide range of bottles.

The mould base support according to the invention, for shaping the bottom of a bottle made of thermoplastic material by what is called the "overstroke base" process, comprises—a base interposed between said mould base and—a sliding bolster which is guided on the frame, or console, of the mould carrier unit, along the axis of the mould, which base is made in the form of a dual-acting cylinder actuator which is constituted—by a cylinder containing a piston the rod of which supports said mould base and—by a cap, or base plate, which closes off said cylinder, which base plate is provided with a finger arranged in its centre, on the axis of said mould base, in order to cooperate with locking means situated on said bolster, and it comprises, around said finger, on the one hand, holes designed to allow the sealed passage of pipes that deliver the heat-transfer fluid and demoulding air into said mould base and, on the other hand, zones for the attachment of the feed pipes for the chambers of said cylinder actuator, which pipes are all placed parallel to the axis of displacement of said mould base, which bolster comprises arrangements, in the form of recesses, or holes, for allowing the passage of the different pipes.

This axial organization, according to the invention, of the different pipes of the mould base support, makes it possible in particular to reduce the space requirement of this support and confine it in a tubular casing which is more in keeping with its environment and in particular with the volume available between the supports of the die halves.

According to another arrangement of the invention, the support comprises pipes for delivery of the heat-transfer fluid and a pipe for delivery of the demoulding air, which pipes are attached directly to the piston of said cylinder actuator.

Still according to the invention, the support comprises pipes for delivery of the heat-transfer fluid and a pipe for delivery of the demoulding air, which pipes are arranged in a triangle around the locking finger, passing through both the base plate of the base and the bolster and, furthermore, said pipes slide in said base plate and with respect to said bolster.

According to another arrangement of the invention, the support comprises feed pipes for the chambers of the cylinder actuator, which are attached directly to the base plate of the base, which pipes pass through the bolster.

Still according to the invention, the different pipes associated with the support are axially distributed around the same circumference which is centred on the axis of the locking finger.

According to another arrangement of the invention, the support comprises feed pipes for the chambers of the cylinder actuator and pipes for transporting the heat-transfer fluid, which are arranged in a square around the locking finger.

Still according to the invention, the support comprises a device for the rapid assembly of the base on the bolster which is constituted by a ball locking system cooperating with the finger of the base plate of said base.

According to another arrangement of the invention, the support comprises means for the angular adjustment of the mould base with respect to the frame of the mould carrier unit, which adjustment means are constituted by the pipes for transport of the heat-transfer fluid and the pipe for introduction of the demoulding air into the base plate of the base, which pipes act as an axial guide.

The invention is described in further detail based on the following description and attached drawings, given by way of indication, and in which:

FIG. 1, represents, diagrammatically and partially, a blow-moulding mould for a bottle-type container 1, which implements the overstroking process.

Figure 1:
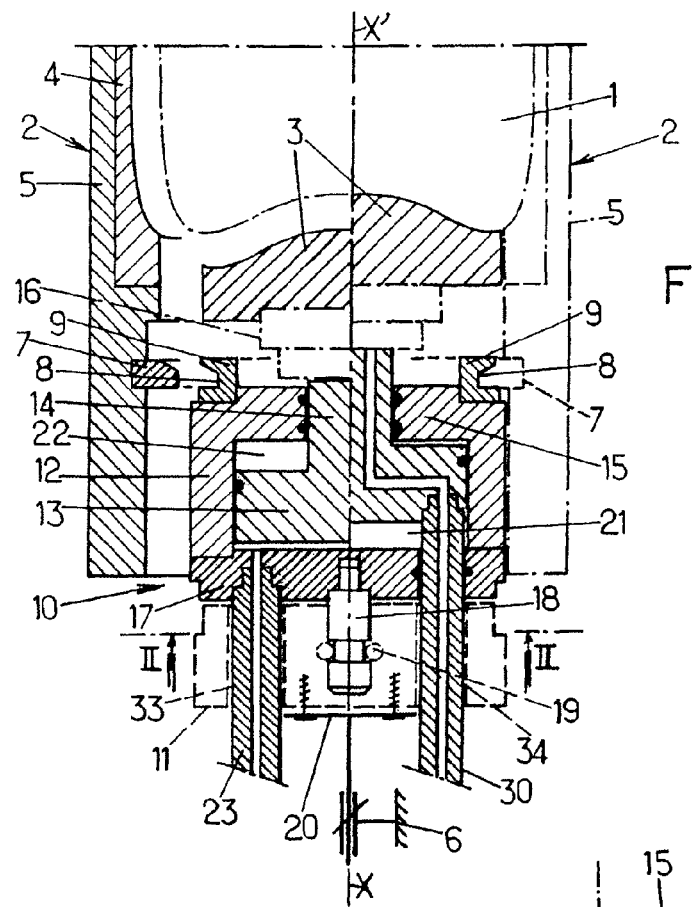
FIG. 1 is a diagrammatic representation, in the form of half cross-sections along I-I, of the mould base support according to the invention, cooperating with supports of the die halves in order to form a bottle.

This blow-moulding mould is constituted, in a standard fashion, by two half-moulds 2 which contain the cavities of the body of the bottle 1 and by a mould 3 which contain the cavity of the base, or bottom, of said bottle.

The half-moulds 2 are generally constituted by a die half 4 which contain the cavity of the bottle 1 and in particular the cavity of its walls and each die half 4 is arranged in a support 5, which die half 4 support 5 is itself fixed to a structure constituted by shells, or corner brackets, not shown, which are firmly fixed to the frame 6, or console, of what is called the mould carrier unit.

The mould base 3 contains the cavity of the base of the bottle 1. This mould base 3, like the die halves 4, is capable of being changed, depending on the shapes of the bottle 1.

For the stretch-blow moulding operation, the die halves 4 are closed, as shown in the right part of FIG. 1; they are closed on the mould base 3 and the assembly is locked by means of studs 7 arranged on the supports 5 of the die halves 4, which studs 7 cooperate with a groove 8 provided on a ring 9 which is firmly fixed to the support described in detail hereafter.

The support of the mould base 3 comprises several elements and in particular—a base 10, on which said mould base 3 is fixed, and—a bolster 11 on which said base 10 is detachably fixed.

This base 10 is presented in the form of a cylinder actuator in order to allow the implementation of the so-called over-stroke base process.

This base 10 comprises a cylinder 12 of a cylinder actuator in which a piston 13 is housed, which piston 13 comprises a rod 14 which, in a tight manner, passes through the end wall 15 of said cylinder 12, on the side of the mould base 3. This mould base 3 is fixed by appropriate means 16 to the end of the rod 14 of the cylinder actuator.

The cylinder 12 is closed by means of a cap which forms a base plate 17. This base plate 17 rests on the bolster 11, represented in fine dot-and-dash lines, and it is firmly secured to said bolster 11 by means which allow rapid assembly of the two parts.

The base plate 17 comprises, for example, a finger 18 centred on the axis x-x' of the cylinder actuator, which finger 18 extends projecting into the bolster 11 and this bolster 11 comprises a ball-type locking system 19 which is maneuvered by appropriate means, compressed air or other means, in order to immobilize said finger 18.

The bolster 11 slides in order to move the base 10 between an active position as shown in FIG. 1 in one of the half cross-sections and in particular in the half cross-section situated on the left, in order to carry out the operation of blow-moulding the container 1, and an inactive position, in which said base 10 is retracted with respect to the die halves 4 in order to allow the removal of the bottle 1 after its moulding.

The bolster 11 is borne by a plate 20 which slides, guided with respect to the frame 6, as described in detail for example, in the document FR 2 873 320.

The piston 13 of the base 10 slides in the cylinder 12 under the effect of a fluid, compressed air for example, which is introduced into the chambers arranged on each side of said piston 13: a chamber 21, on the side of the base plate 17 and a chamber 22 on the side of the end wall 15 of the cylinder 12.

The chamber 21 is fed with compressed air under a pressure which corresponds to the bottle blow-moulding pressure in order to achieve equilibrium, which feed is carried out by means of a pipe 23 which is attached to a zone situated on the periphery of the base plate 17. This pipe 23 extends parallel to the axis x-x' of the rod 14 of the cylinder actuator, i.e. parallel to the axis of displacement of the mould base 3, and it is situated on the side of the base plate 17, leaving free the central part which comprises the rapid assembly system and in particular the locking finger 18.

The left part of FIG. 1 shows the cylinder actuator and the mould base 3, in the inactive waiting position. This position corresponds, when the half-moulds 2 are closed, to the blow-moulding phase which makes it possible to expand the preform in order to transform it into a bottle, while, stretching its constitutive material to the maximum.

For this stretch-blow moulding operation, the half-moulds 2 are closed, as shown in the right part of FIG. 1. The base 10 is anchored to the supports 5 of the die halves 4 by means of the studs 7 and the groove 8 provided on the ring 9 which is firmly fixed to said base 10 and in particular with the end wall 15 of the cylinder 12, on the side of the outlet of the rod 14 from the cylinder actuator.

When the blow-moulding operation is finished, the base of the bottle 1 is overstroked by means of the mould base 3. This mould base 3 is moved, placed in the active position, by the rod 14 of the piston 13 which is moved under the effect of the compressed air during its introduction under high pressure, equivalent to the blow-moulding pressure, into the chamber 21, as shown in the right part of FIG. 1.

In order to carry out this operation of shaping the bottle 1, the temperature of the mould base 3 is maintained by means of a heat-transfer fluid which circulates in circuits provided in said mould base 3. This heat-transfer fluid is introduced, as shown in FIG. 1, by means of a pipe 30 which is attached directly to the piston 13, which pipe 30 passes through the base plate 17 in a tight manner.

This pipe 30, like the pipe 23, is parallel to the axis x-x' of the cylinder actuator and of the rod 14. This pipe 30 is also positioned on the side of the base plate 17 and on the rim of the piston 32, in order to clear the central space of the bolster 11 which comprises the rapid assembly system and in particular the finger 18.

The pipe 30 slides in the base plate 17, as the rod 14 slides in the end wall 15 of the cylinder 12, in a tight manner.

Figure 2:
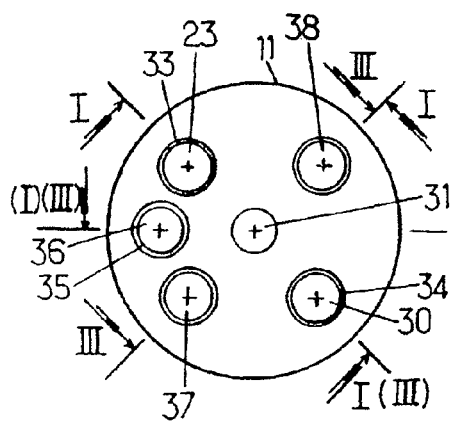
FIG. 2 is a section along II-II in FIG. 1, showing the bolster and the distribution of the different pipes which pass through said bolster.

FIG. 2 shows the different pipes which feed, on the one hand, the chambers 21 and 22 of the cylinder actuator and, on the other hand, the mould base 3, which mould base 3 is fed with heat-transfer fluid and it is also fed with compressed air in order to detach the base of the container from the cavity of said mould base 3.

This FIG. 2 in fact shows the bolster 11 which comprises, in its central part, a hole 31 for the passage of the locking finger 18 and, on its periphery, several holes, or recesses, which allow the passage of the different pipes. Thus, there is a hole 33 for the passage of the pipe 23 which serves to feed the chamber 21 with compressed air. There is also a hole 34, which allows the passage of the pipe 30 for introduction of the heat-transfer fluid at the mould base 3. There is also a hole 35, situated close to the hole 33, which allows the passage of a pipe 36, which pipe 36 allows the introduction of compressed air at the cavity of the mould base 3 in order to detach the base of the bottle 1 before its demoulding. This pipe 36 passes through the base plate 17, in a tight manner and it is positioned, for example, like the pipe 30 which is shown in FIG. 1.

This FIG. 2 effectively indicates the possible different half cross-sections along I-I in order to show the positioning of the different pipes and in particular the pipes 30 and 36 which are attached, in the same manner, to the piston 13 and which, in the same manner, i.e. in a tight manner, pass through the base plate 17.

Figure 3:
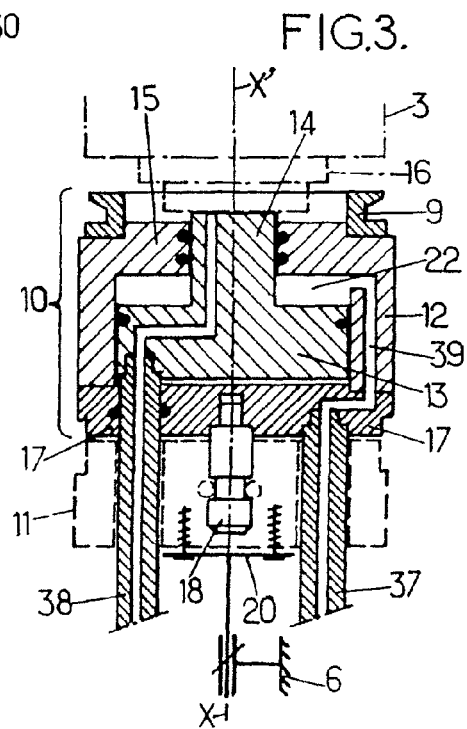
FIG. 3 is a diagrammatic representation of a cross-section along III-III in FIG. 2, showing the pipes and the arrangements of the channels which make it possible to feed one of the chambers of the piston and, by multiple half cross-sections, still along III-III, showing the different feeds of the mould base.

FIG. 3 is a cross-section along III-III in FIG. 2, showing, on the one hand, the pipe 37 which is attached to the base plate 17 and which feeds the chamber 22 of the cylinder actuator and, on the other hand, a pipe 38 corresponding to the pipe 30 of FIG. 1, which pipe 38 acts, for example, as a return pipe for the heat-transfer fluid.

The pipe 37 is attached to a zone which is situated at the periphery of the base plate 17 and a circuit 39 is provided in this base plate 17 and in the cylinder 12 in order to open at the level of the chamber 22.

The pipe 38 is attached, like the pipe 30 and like the pipe 36, directly to the piston 13, in a zone which is situated on the periphery of said piston. These three pipes 30, 36, 38, pass through the base plate 17 in a tight manner. A circuit is provided in the piston 13 and in the rod 14 of the latter in connection with the mould base 3 in order to allow the circulation of the heat-transfer fluid passing through the pipes 30 and 38.

In this FIG. 3, the piston 13 is in a waiting position, i.e. the mould base 3 is retracted into a position which corresponds to the initial blow-moulding phase.

In order to move the piston 13, a fluid, compressed air for example, is introduced under a moderate pressure of 7 bars, into the chamber 22.

All the pipes 23, 30, 36, 37 and 38 are parallel to the axis x-x', i.e. to the axis of displacement of the mould base 3; they are also distributed, for example, around a circumference centred on said axis x-x'.

The pipes 30, 36 and 38 are arranged in a triangle around the finger 18. These three pipes 30, 36 and 38 slide, in a tight manner, in the base plate 17 and the guiding of these three pipes in said base plate 17 also serves as a means for the locking and angular adjustment of the mould base 3 with respect to the frame 6 of the mould carrier unit, via the base 10 and the bolster 11. These different pipes 30, 36 and 38 also slide with respect to the bolster 11 when the mould base 3 is moved, driven by the piston 13.

The pair of pipes 33, 37, and the pair of pipes 30, 38 occupy the angles of a square; each pair of pipes being arranged on one side of said square. These different pipes have their axis which is situated on the same circumference, which circumference is itself centred on the axis x-x' of the cylinder actuator and of the finger 18.

Each of the different pipes comprises, at its end, beyond the base plate 17, a rapid connection system, not shown, to the different compressed air and heat-transfer fluid feeds.

The invention claimed is:

1. A mould base support for shaping a bottom of a bottle made of thermoplastic material, which mould base support comprises a base interposed between a mould base and a sliding bolster which is guided on a frame, of a mould carrier unit, along an axis of displacement of said mould base;
   wherein said base is made in the form of a dual-acting cylinder actuator comprising a cylinder containing a piston that has a rod which supports said mould base, and a base plate, which closes off said cylinder;
   wherein said base plate is provided with a finger arranged in a center of said base plate, on said axis, in order to cooperate with a locking mechanism on said bolster, and said base plate comprises, around said finger holes designed to allow a sealed passage of heat transfer and demoulding pipes which deliver a heat-transfer fluid and demoulding air to said mould base and zones for an attachment of feed pipes for chambers of said cylinder actuator, which heat transfer and demoulding pipes and feed pipes are all arranged parallel to said axis of displacement of said mould base; and
   wherein said bolster comprises arrangements, in the form of holes, or recesses, for allowing a passage of said heat transfer and demoulding pipes and said feed pipes.

2. The mould base support according to claim 1, wherein said heat transfer and demoulding pipes comprise delivery pipes for delivery of said heat-transfer fluid and a delivery pipe for delivery of said demoulding air, which delivery pipes are attached directly to said piston of said cylinder actuator.

3. The mould base support according to claim 1, wherein said feed pipes for said chambers of the cylinder actuator are attached directly to said base plate.

4. The mould base support according to claim 1, wherein said feed pipes for said chambers of said cylinder actuator and said heat transfer and demoulding pipes for transport of said heat-transfer fluid are arranged in a square around said locking finger.

5. The mould base support according to claim 1, further comprising a device for a rapid assembly of said base on said bolster which is constituted by a ball locking system cooperating with said finger of said base plate.

6. The mould base support according to claim 1, further comprising means for an angular adjustment of said mould base with respect to said frame which comprises said heat transfer and demoulding pipes for transport of said heat-transfer fluid and introduction of said demoulding air into said base plate of said base, which said heat transfer and demoulding pipes act as a guide.

7. A mould base support for shaping a bottom of a bottle made of thermoplastic material, which mould base support comprises a base interposed between a mould base and a sliding bolster which is guided on a frame, of a mould carrier unit, along an axis of displacement of said mould base:
   wherein said base is made in the form of a dual-acting cylinder actuator which is constituted by a cylinder containing a piston, which has a rod which supports said mould base and by a base plate, which closes off said cylinder;
   wherein said base plate is provided with a finger arranged in a center of said base plate, on said axis, in order to cooperate with a locking mechanism situated on said bolster, and said base plate comprises, around said finger, holes designed to allow a sealed passage of heat transfer and demoulding pipes which deliver a heat-transfer fluid and demoulding air to said mould base and zones for an attachment of feed pipes for chambers of said cylinder actuator, which heat transfer and demoulding pipes and feed pipes are all arranged parallel to said axis of displacement of said mould base; and
   wherein said bolster comprises arrangements, in the form of holes, or recesses, for allowing a passage of said heat transfer and demoulding pipes and said feed pipes,
   wherein said heat transfer and demoulding pipes comprise delivery pipes for delivery of said heat-transfer fluid and a delivery pipe for delivery of said demoulding air, which delivery pipes are attached directly to said piston of said cylinder actuator,
   and wherein said delivery pipes for delivery of said heat-transfer fluid and said delivery pipe for delivery of said demoulding air are arranged in a triangle around said locking finger passing through said base plate and said bolster.

8. A mould base support for shaping a bottom of a bottle made of thermoplastic material, which mould base support comprises a base interposed between a mould base and a sliding bolster which is guided on a frame, of a mould carrier unit, along an axis of displacement of said mould base;
   wherein said base is made in the form of a dual-acting cylinder actuator which is constituted by a cylinder containing a piston, which has a rod which supports said mould base and by a base plate, which closes off said cylinder;
   wherein said base plate is provided with a finger arranged in a center of said base plate, on said axis, in order to cooperate with a locking mechanism situated on said bolster, and said base plate comprises, around said finger, holes designed to allow a sealed passage of heat transfer and demoulding pipes which deliver a heat-transfer fluid and demoulding air to said mould base and zones for an attachment of feed pipes for chambers of said cylinder actuator, which heat transfer and demoulding pipes and feed pipes are all arranged parallel to said axis of displacement of said mould base; and
   wherein said bolster comprises arrangements, in the form of holes, or recesses, for allowing a passage of said heat transfer and demoulding pipes and said feed pipes,
   wherein said heat transfer and demoulding pipes and feed pipes have axes which are distributed around a same circumference which is centered on said axis of displacement of said mould base.

9. A mould base asembly for shaping a bottom of a bottle made of thermoplastic material using an overstroking process, comprising:
   a mould base;
   a bolster slidably movable on a frame along a displacement axis of the mould base;
   a separate base interposed between the mould base and the bolster, the base comprising a dual-acting cylinder actuator comprising a cylinder, a piston comprising a rod that supports the mould base, and a base plate closing off the cylinder;
   the base plate comprising a finger cooperating with a locking mechanism on the bolster that secures the finger, the base plate comprising around the finger openings configured to allow passage of heat transfer and demoulding pipes that deliver a heat-transfer fluid and demoulding air to the mould base and openings for attachment of feed pipes for chambers of the cylinder actuator; and
   the bolster comprising openings or recesses for passage of the heat transfer and demoulding pipes and the feed pipes.

10. The mould base assembly according to claim 9, wherein the heat transfer and demoulding pipes and feed pipes are arranged parallel to the displacement axis of the mould base.

* * * * *